United States Patent
Ossig et al.

(10) Patent No.: US 7,193,690 B2
(45) Date of Patent: Mar. 20, 2007

(54) LASER SCANNER AND METHOD FOR OPTICALLY SCANNING AN ENVIRONMENT

(75) Inventors: Martin Ossig, Tamm (DE); Reinhard Becker, Ludwigsburg (DE); Bernd-Dietmar Becker, Ludwigsburg (DE)

(73) Assignee: Faro Technologies, Inc., Lake Mary, FL (US)

( * ) Notice: Subject to any disclaimer, the term of this patent is extended or adjusted under 35 U.S.C. 154(b) by 0 days.

(21) Appl. No.: 11/477,310

(22) Filed: Jun. 29, 2006

(65) Prior Publication Data

US 2006/0245717 A1    Nov. 2, 2006

Related U.S. Application Data

(63) Continuation of application No. PCT/EP04/014605, filed on Dec. 22, 2004.

(30) Foreign Application Priority Data

Dec. 29, 2003   (DE)   ................................ 103 61 870

(51) Int. Cl.
    *G01C 3/00*    (2006.01)
(52) U.S. Cl. .................... 356/4.01; 356/4.07; 356/5.04
(58) Field of Classification Search ............... 356/3.01, 356/3.05, 3.09, 3.11, 4.01, 4.07, 5.04, 5.05, 356/601, 607, 608, 614
    See application file for complete search history.

(56) References Cited

U.S. PATENT DOCUMENTS

| | | | |
|---|---|---|---|
| 3,830,567 A | 8/1974 | Riegl | ............................. 356/5 |
| 5,313,261 A | 5/1994 | Leatham et al. | ................ 356/4 |
| 6,512,575 B1 * | 1/2003 | Marchi | ....................... 356/5.1 |
| 6,710,859 B2 * | 3/2004 | Shirai et al. | ................ 356/5.01 |
| 6,856,381 B2 * | 2/2005 | Christoph | ................... 356/4.05 |
| 2002/0143506 A1 | 10/2002 | D'Aligny et al. | ............... 703/6 |
| 2003/0043386 A1 | 3/2003 | Froehlich et al. | ........... 356/601 |
| 2005/0046823 A1 * | 3/2005 | Ando et al. | ................. 356/4.01 |

FOREIGN PATENT DOCUMENTS

| | | |
|---|---|---|
| DE | 22 16 765 A1 | 4/1972 |
| DE | 202 08 077 U1 | 5/2002 |

OTHER PUBLICATIONS

PCT Search Report—PCT/EP2004/014605.

* cited by examiner

*Primary Examiner*—Hemang Sanghavi
(74) *Attorney, Agent, or Firm*—Cantor Colburn LLP

(57) ABSTRACT

A laser scanner for optically scanning and measuring an environment comprises a light transmitter having a predetermined transmission power for emitting a light beam. The emitted light beam is reflected at a measurement point in the environment. The reflected light beam is received with a certain intensity by a receiver. The transmission power is adjustable as a function of the intensity of the reflected light beam. Furthermore, a gray-scale value of the measurement point is determined as a function of the transmission power adjusted.

13 Claims, 1 Drawing Sheet

LASER SCANNER AND METHOD FOR OPTICALLY SCANNING AN ENVIRONMENT

CROSS-REFERENCE TO RELATED APPLICATIONS

This is a continuation of international patent application PCT/EP2004/014605 filed on Dec. 22, 2004 and published in German language as WO 2005/064273 A1, which international patent application claims priority from German patent application DE 103 61 870.8 filed on Dec. 29, 2003.

BACKGROUND OF THE INVENTION

The invention relates to a laser scanner and a method for optically scanning and measuring an environment. More particularly, the invention relates to laser scanners used to scan and measure a variety of interior and exterior spaces. For instance, these may be manufacturing buildings in which specific facilities are planned. In this case, the laser scanner is placed on a stand into the space to be measured, and the measuring head is slowly rotated about a vertical axis, while a rotor—arranged in the measuring head—with a light transmitter rotates at a significantly higher rotational speed about a horizontal axis. In this way, the fast rotation results in a light fan being generated in a vertical plane, said light fan being slowly rotated through e.g. 360°, so that finally the entire environment has been scanned. The emitted light beams are reflected from the points in the environment, and the reflected light beam is received by the measuring head again. In this case, both the distance of the respectively measured point in the environment and the reflectivity of said point are determined, so that finally a faithful imaging with a solid angle of ideally 360° arises.

In another application of such scanners, elongated cavities, such as tunnels, are measured. In this case, the light transmitter rotates about a horizontal axis and it is moved along the tunnel to be measured. In this way, it is possible to monitor the state of tunnels, to determine the clearance at any point in the tunnel, etc.

Laser scanners of the abovementioned type are usually specified for a specific distance range. This means that objects can be detected and measured at greater or lesser distance depending on the class of the components used. Typically, the intensity of the reflected light beam depends on the distance of the measurement point and its reflectivity. The intensity of the reflected light beam results in a certain gray-scale value provided by the receiver.

In applications of laser scanners for a large distance range, where objects situated at a large distance are still to be reliably identified and measured, and in applications with a large gray-scale value range, where measurement points having a relatively poor reflectivity are to be reliably differentiated, the receiver's dynamic range limits are soon encountered. It must be taken into account that the intensity of the reflected light beam decreases more than proportionally with the distance. Thus, the quantity of light that is reflected from an object at a distance of 50 m amounts to only approximately $4\times10^{-6}$ of the quantity of light that is reflected from an object at a distance of 0.1 m. The range of different gray-scale values is an additional factor. According to the current prior art there are no receivers available which cover such a wide dynamic range.

DE 22 16 765 C3 discloses a method and a device for distance measurement. This involves determining first of all the distance to a specific measurement point and optionally also the reflectivity of the measurement point. The distance is determined from a propagation time measurement between an emitted light pulse and the light pulse reflected from the measurement point. Errors can occur if the propagation time measurement is ended and the received signal, i.e. a signal pulse generated from the reflected light pulse, reaches a specific trigger level but this signal pulse has an undefined maximum amplitude. In order to preclude this error, a regulation is performed which brings about an adjustment in such a way that the signal pulse is raised from a lower initial value until it has reached a defined level. The regulation works by adjusting either the transmission power or the reception gain prior to the generation of the signal pulse. The reflectivity is determined by detecting the amplitude of the signal pulse before being raised to the defined level and comparing it with a predetermined transmission power. In this case, furthermore, from the measured distance, a weighting is additionally carried out in order to calculate out the dependence of the amplitude of the reflected light pulse on the distance of the measurement point.

The known device and the known method are thus limited for measurements at a single measurement point, because the measurement point has to be intrinsically optimized in each case by adjusting the transmission power and/or the reception gain. This precludes scanning 2D or 3D measurements of an environment.

Furthermore, the reflectivity of the measurement point can be determined only when the absolute transmission power in the system that has not yet been adjusted is known. The inclusion of the distance finally determined and the weighting of the reflection value with this distance lead, finally, to an absolute value of the reflectivity at the location of the measurement point, but not to the gray-scale value received at the location of the measuring apparatus. This is because said gray-scale value is independent of distance. Specifically, in the case where an environment is represented in the manner of a photograph, each point has, for an observer, a gray-scale value that says nothing about how far away the point is from the observer. Therefore, image recordings of an environment cannot be produced by means of the known procedure.

SUMMARY OF THE INVENTION

In view of the above, it is an object of the invention to provide a laser scanner and method that allow measurements over a wide distance range and a wide gray-scale value range.

According to one aspect of the invention, this object is achieved by a laser scanner for optically scanning and measuring an environment, comprising a light transmitter for emitting a transmitter light beam to a measurement point in the environment, and a receiver for receiving a reflected light beam reflected from said measurement point, said receiver being configured to provide a grey-scale value representative of the measurement point, wherein the reflected light beam has an intensity, wherein the light transmitter has a predetermined transmission power which is adjustable as a function of the intensity, and wherein the receiver is configured to provide the gray-scale value as a function of the adjusted transmission power.

According to another aspect, this object is achieved by a method of optically scanning and measuring an environment, comprising the steps of: emitting a transmission light beam from a light transmitter to a measurement point in the environment, the light transmitter having a adjustable transmission power, receiving a reflected light beam reflected from said measurement point, the reflected light beam having an intensity, and determining a grey-scale value representative of the measurement point, wherein the transmission power of the light transmitter is adjusted as a function of the intensity, and wherein the gray-scale value is determined as a function of the adjusted transmission power.

The new scanner and method allow for a generally reduced transmission power and a high-quality reproduction of the environment of the laser scanner in a half tone representation. For varying distances and/or varying reflectivity of the measurement points, imaging errors are avoided by the transmission power being increased or reduced. Since the transmission power is taken into account in the formation of the gray-scale value, the measurement error systematically generated by the adjustment of the transmission power is precisely "calculated out" again, so that an unaltered faithful image of the environment is generated as a halftone representation.

For measurement points that are further away and/or weakly reflective, the transmission power is increased in order that the reflected signal still has a sufficient magnitude so as not to overtax the dynamic range of the receiver. Conversely, the transmission power can also be reduced in the case of very close and/or strongly reflective measurement points. This contrivance therefore makes possible, in a relatively simple manner, a reliable measurement even with large distance and/or gray-scale value ranges, without an excessive outlay having to be implemented for the receiver or actually overtaxing the possibilities of commercially available receivers. Furthermore, by limiting the transmission power, a lower energy consumption is made possible and persons in the vicinity of the scanner are reliably protected against injury, in particular eye injury.

In a preferred refinement of the invention, the transmission power is adjustable in such a way that the intensity of the reflected light beam is kept at least approximately constant.

This measure has the advantage that even receivers having a very small dynamic range and therefore having very low costs can be used.

In a exemplary embodiment of the invention, an adjustable power supply unit is assigned to the light source, the receiver being connected to the power supply unit via a first characteristic curve stage.

This measure has the advantage that, using simple circuitry means, it becomes possible to set the transmission power for a varying intensity of the reflected measurement beam, in which case the characteristic curve of the characteristic curve stage can be assigned in a manner dependent on the physical conditions such that the function of the intensity or the power of the emitted light beam against the intensity of the reflected measurement beam becomes substantially linear, if not even at least approximately constant.

In another embodiment, the receiver includes an adjustable amplifier, the control input of which is connected to the power supply unit via a second characteristic curve stage.

This allows a practical implementation with simple circuitry. The second characteristic curve stage makes possible a complete compensation of the adjustment of the transmission power as a function of the intensity of the reflected light beam.

Further advantages will be understood from the following description and the accompanying drawing. It goes without saying that the features mentioned above and those yet to be explained below can be used not only in the combination respectively specified, but also in other combinations or on their own, without departing from the scope of the present invention.

BRIEF DESCRIPTION OF THE FIGURES

An exemplary embodiment of the invention is illustrated in the drawing and is explained in more detail in the description below. In the figures.

DESCRIPTION OF PREFERRED EMBODIMENTS

Figure 1:
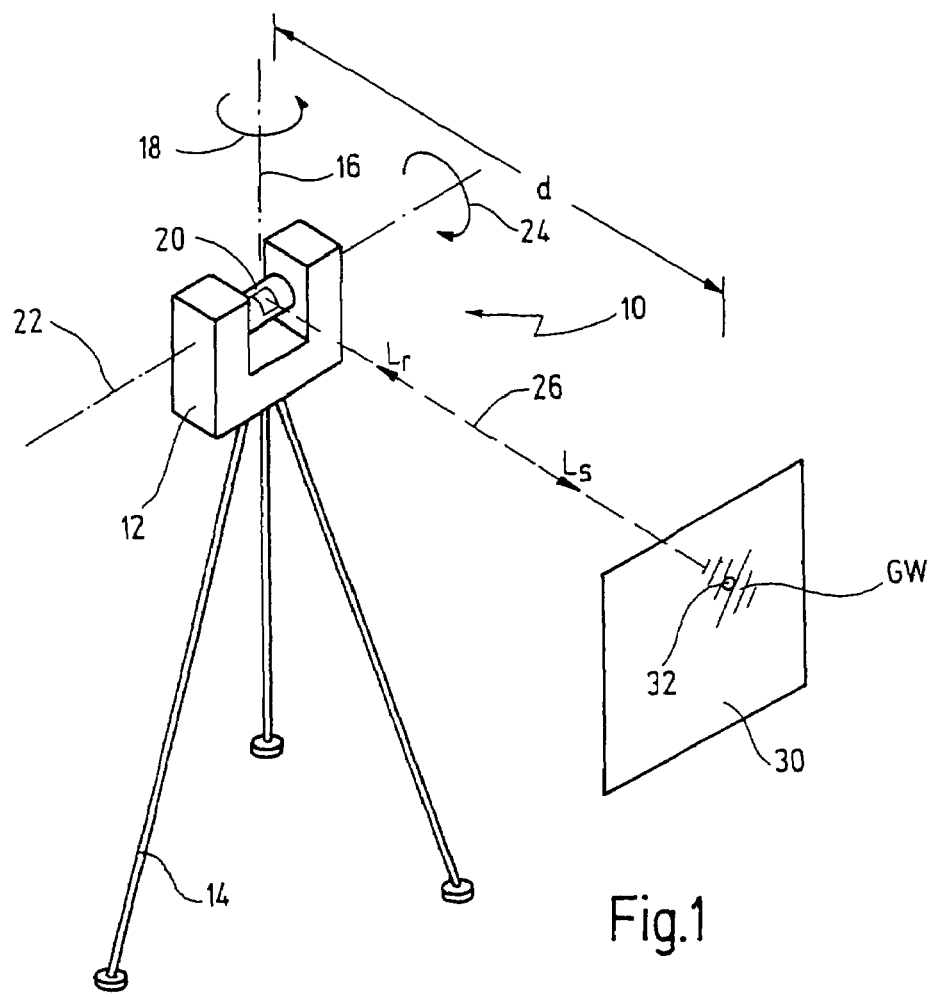
FIG. 1 shows an extremely schematic perspective illustration of a use of a device according to the invention in practice.

In FIG. 1, reference numeral 10 designates a laser scanner for the optical scanning and measurement of an environment of the laser scanner 10. In an exemplary embodiment illustrated in FIG. 1, an image of the environment with a solid angle of ideally 360° is intended to be generated from a static point.

For this purpose, the laser scanner 10 contains a measuring head 12 situated on a spatially fixed stand 14. In this case, the measuring head 12 is rotatable as a whole relatively slowly about a vertical axis 16, as indicated by an arrow 18.

The measuring head 12 contains, for its part, a rotor 20, which is rotatable significantly faster, that is to say at a significantly higher rotation speed, about a horizontal axis 22, as indicated by an arrow 24.

The rotor 20 emits a light beam 26. In FIG. 1, the beam emitted by the rotor 20 is designated by Ls, while a beam reflected from an object 30 in the environment is indicated by Lr.

In the situation illustrated in FIG. 1, an object 30 is situated at a distance d from the measuring head 12, on which object a measurement point 32 is currently being illuminated by the light beam 26. Let the measurement point 32 have a gray-scale value GW.

Figure 2:
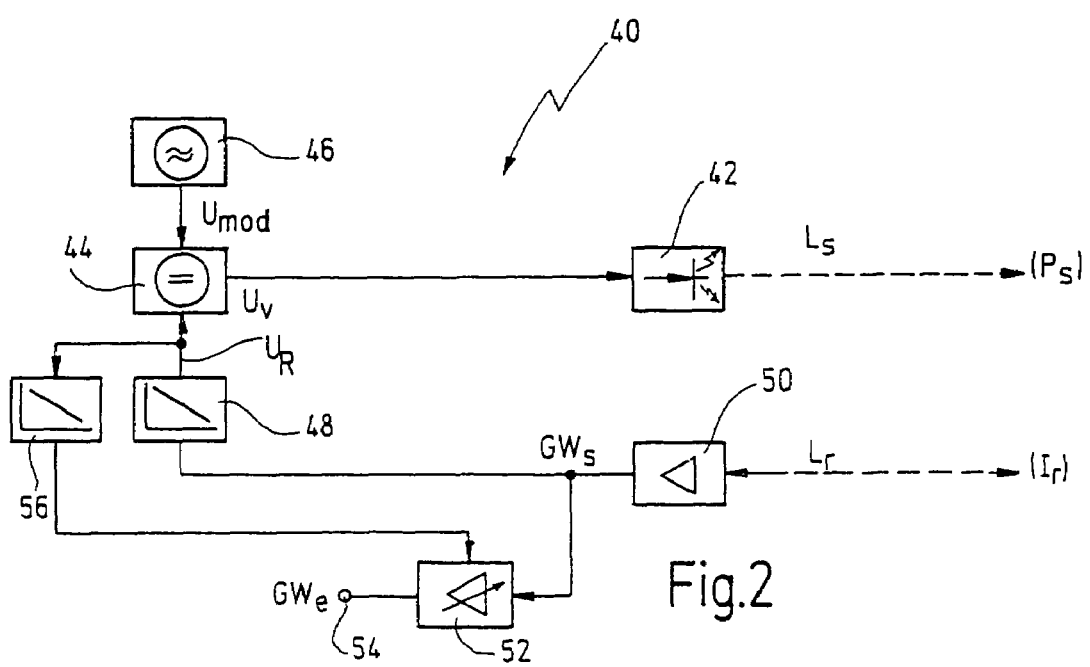
FIG. 2 shows a schematic block diagram of an exemplary embodiment of a device according to the invention.

FIG. 2 shows a circuit arrangement 40 arranged within the measuring head 12.

The circuit arrangement 40 contains a light source 42 that rotates with the rotor 20, for example a laser diode, which emits the light beam Ls with the transmission power Ps. The light source 42 is fed with a supply voltage $U_V$ by an adjustable power supply unit 44. The transmission power Ps of the light source 42 can be set in this way.

The power supply unit 44 has connected to it, for the purpose of influencing the transmission power Ps, on the one hand a modulation oscillator 46 with a modulation voltage $U_{Mod}$ and on the other hand a first characteristic curve stage 48 with an output regulation voltage $U_R$, the function of which will be explained below.

On the input side, the circuit arrangement 40 contains a receiver indicated by 50, which receives the reflected light beam Lr with the intensity Ir. The receiver 50 is preferably situated in direct proximity to the light source 42, because the emitted beam Ls is likewise in direct proximity to the reflected beam Lr or may even coincide with the latter. In the last-mentioned case, a semitransparent mirror or the like may be used for separating the beams Ls and Lr. These problems are known to the person skilled in the art of laser scanners and therefore need not be explained any further here.

The receiver 50 supplies at its output a signal which corresponds to an apparent gray-scale value GWs. On the output side, the receiver 50 is connected to an adjustable amplifier 52. The amplifier 52 has an output terminal 54, at which a signal corresponding to a genuine gray-scale value GWe can be tapped off.

The gain factor of the adjustable amplifier 52 is controlled by means of a second characteristic curve stage 56, which is connected on the input side e.g. to the output of the first characteristic curve stage 48. In this case, it is important that a signal reproducing the transmission power Ps is applied to the second characteristic curve stage 56 on the input side. In the exemplary embodiment this may be the output signal of the first characteristic curve stage 48, but need not be said signal.

The circuit arrangement 40 operates as follows: By means of the modulation oscillator 46, the amplitude of the emitted beam Ls, that is to say the transmission power Ps, is modulated with the modulation voltage $U_{Mod}$ in a manner known per se. This modulation signal then also appears in the reflected beam Lr and is evaluated as distance signal by means of the receiver 50 (not illustrated).

The output signal of the receiver 50 is a measure of the intensity Ir of the reflected light beam Lr. This signal is fed to the first characteristic curve stage 48, which has a degressive profile. The degressive profile takes account of the change in the intensity $I_r$ depending on the distance d and on the gray-scale value GW. At the output of the first characteristic curve stage 48, therefore, a regulation voltage $U_R$ is present which is all the higher, the smaller the intensity Ir becomes on account of a larger distance d or a larger gray-scale value GW. The regulation voltage $U_R$ influences the power supply unit 44, so that the supply voltage $U_V$ increases in inverse dependence on the intensity Ir, to be precise preferably more than proportionally or exponentially. As a result, the transmission power Ps also increases, with the consequence that the intensity $I_r$ of the reflected beam Lr decreases to a much lesser extent as the distance d or gray-scale value GW increases than would be case without the regulation described. In the extreme case, it remains at least approximately constant. For this purpose, a desired value predefinition may additionally be added to the circuit 42, 44, 48, 50 described (not illustrated).

This measure has no influence on the evaluation of the distance d, because the distance d is obtained by the modulation, that is to say by the phase shift between the modulation voltage $U_{Mod}$ and the modulated component of the reflected beam Lr.

The adjustment of the transmission power Ps in a manner dependent on the intensity Ir of the reflected light beam Lr leads to a systematic corruption of the gray-scale value signal, because the latter is directly dependent on the intensity $I_r$ of the reflected beam Lr. This is the reason while the output signal of the receiver 50 was referred to as an "apparent" gray-scale value GWs.

In order to correct these systematic corruptions again, a correction signal is formed from the output signal $U_R$ of the first characteristic curve stage 48 or some other signal which reproduces the transmission power Ps, by means of the second characteristic curve stage 56, which correction signal adjusts the adjustable amplifier 52 in order to bring abut the correction mentioned. The "genuine" gray-scale value GWe thus appears at the output terminal 54 of said amplifier.

In this case, the characteristic curve of the second characteristic curve stage 56 is likewise degressive, because owing to the adjustment of the transmission power Ps for large distances d and high gray-scale values GW, the measured intensity $I_r$ is greater than it would be if the transmission power Ps was not adjusted in a manner dependent on the transmission power Ps.

What is claimed is:

1. A laser scanner for optically scanning and measuring an environment, comprising
    a light transmitter for emitting a transmitter light beam to a measurement point in the environment, and
    a receiver for receiving a reflected light beam reflected from said measurement point, said receiver being configured to provide a grey-scale value representative of the measurement point,
    wherein the reflected light beam has an intensity,
    wherein the light transmitter has a predetermined transmission power which is adjustable as a function of the intensity, and
    wherein the receiver is configured to provide the gray-scale value as a function of the adjusted transmission power.

2. The laser scanner of claim 1, wherein the transmission power is adjustable in such a way that the intensity of the reflected light beam is kept substantially constant for varying distances between the light transmitter and the measurement point.

3. The laser scanner of claim 1, wherein the light transmitter comprises a light source and an adjustable power supply unit connected to the light source for adjusting the transmission power.

4. The laser scanner of claim 3, further comprising a first characteristic curve stage, with the receiver being connected to the adjustable power supply unit via the first characteristic curve stage for adjusting the power supply unit.

5. The laser scanner of claim 4, wherein the receiver comprises an adjustable amplifier having a control input connected to at least one from the adjustable power supply unit and the first characteristic curve stage for controlling the amplifier as a function of the transmission power.

6. The laser scanner of claim 5, further comprising a second characteristic curve stage, with the control input connected to the at least on from the adjustable power supply unit and the first characteristic curve stage via the second characteristic curve stage.

7. The laser scanner of claim 1, further comprising a measuring head rotatable about at least one axis of rotation, with the light transmitter being located in the measuring head.

8. The laser scanner of claim 7, wherein the receiver is located in the rotatable measuring head.

9. The laser scanner of claim 1, wherein the receiver is configured to provide a distance from the laser scanner to the measurement point in response to the reflected light beam.

10. A method of optically scanning and measuring an environment comprising the steps of:
    emitting a transmission light beam from a light transmitter to a measurement point in the environment, the light transmitter having a adjustable transmission power,
    receiving a reflected light beam reflected from said measurement point, the reflected light beam having an intensity, and
    determining a grey-scale value representative of the measurement point,
    wherein the transmission power of the light transmitter is adjusted as a function of the intensity, and wherein the gray-scale value is determined as a function of the adjusted transmission power.

11. The method of claim 10; wherein the light transmitter is rotated about at least one axis of rotation in order to direct the transmitter light beam to a plurality of measurement points.

12. The method of claim 10, wherein the transmission power is adjusted in such a way that the intensity of the reflected light beam is kept substantially constant for varying distances between the light transmitter and the measurement point.

13. The method of claim 10, wherein a distance from the light transmitter to the measurement point is determined in response to the reflected light beam.

* * * * *